H. JEFFREY.
NUT LOCK.
APPLICATION FILED MAR. 31, 1908.
899,869.
Patented Sept. 29, 1908.
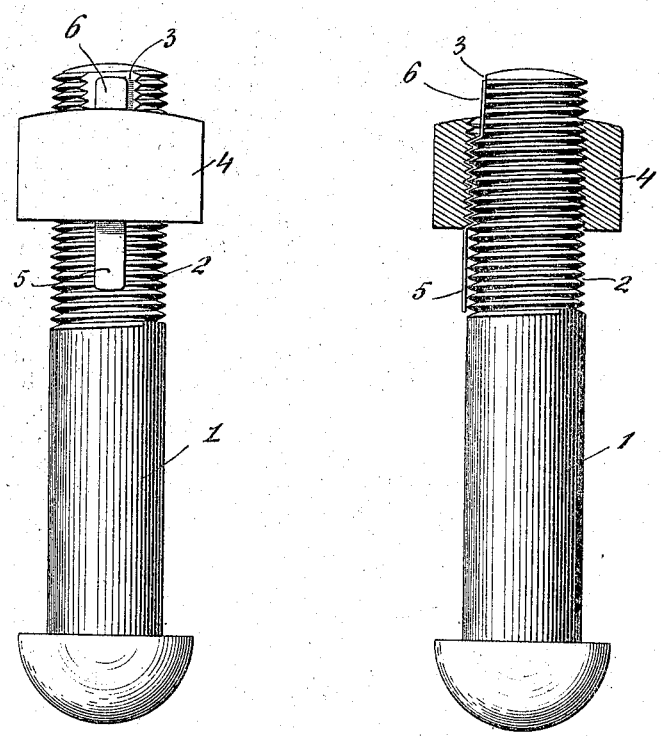
Fig. 1.
Fig. 2.
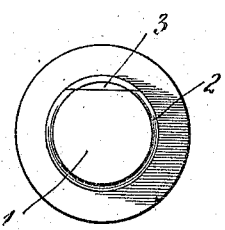
Fig. 3.
Witnesses
A. H. Rabsag
D. H. Butler
Inventor
H. JEFFREY,
By H. C. Everett & Co.
Attorneys

UNITED STATES PATENT OFFICE.

HARRY JEFFREY, OF LOUISVILLE, KENTUCKY.

NUT-LOCK.

No. 899,869.

Specification of Letters Patent.

Patented Sept. 29, 1908.

Application filed March 31, 1908. Serial No. 424,394.

*To all whom it may concern:*

Be it known that I, HARRY JEFFREY, a citizen of the United States of America, residing at Louisville, in the county of Jefferson and State of Kentucky, have invented certain new and useful Improvements in Nut-Locks, of which the following is a specification, reference being had therein to the accompanying drawing.

This invention relates to nut locks, and the primary object of my invention is to provide positive and reliable means for preventing a nut from becoming disengaged from a bolt after having once been placed thereon.

A further object of my invention is to provide a simple and inexpensive nut lock that will not injure the bolt or nut in connection with which the same is used.

With the above and other objects in view, which will readily appear as the invention is better understood, the same consists in the novel construction, combination, and arrangement of parts to be presently described and then specifically pointed out in the appended claims.

In the drawings, Figure 1 is a plan of a nut lock constructed in accordance with my invention. Fig. 2 is a side elevation of the same showing the nut in section, and Fig. 3 is an end view of a bolt constructed in accordance with my invention.

In the accompanying drawings 1 designates a bolt having its threaded end 2 cut away to provide a flat surface 3 at the end of the bolt. A nut 4 is adapted to screw upon the threaded end 2 of a bolt 1.

To lock the nut 4 upon the bolt 1, I use a flat strip of soft metal 5 such as lead. This strip of metal is placed upon the bolt with one end thereof lying upon the flat surface 3 of the bolt, as at 6, and then the nut 4 is screwed upon the bolt and upon the soft metal strip 5, mutilating said strip and causing the metal thereof to impinge the threads of a bolt and nut and wedge between said threads.

The strip 5 of metal is extremely thin, and the flat face 3 on the bolt is provided so that the nut may be given a good start on, or engagement with the threads of the bolt before the nut engages with the strip 5. As will be seen by reference to Fig. 1 of the drawings, the flat face 3 on the bolt is made considerably wider than the width of the strip 5 employed, so that, until the inner end of the nut reaches the unmutilated threads of the bolt, no engagement of the nut with the strip 5 is had. The strip 5 before being placed on the bolt is bent or offset so that the outer portion thereof lies flat upon the flat surface 3 and thus the edges of this outer portion of the strip is within the confines of the bolt diameter, and the nut threads onto the bolt free from engagement with the strip until the shoulder at the inner end of the flat surface 3 is encountered. By this time, the nut is in threaded engagement with the bolt throughout the major portion of the threads of the nut, and a resultant greater purchase obtains to enable the forcing of the nut onto the thin metal strip, and the compression thereof into the threads of the bolt. By offsetting a portion of the strip so as to cause the same to lie flat on the flat face 3 of the bolt, and thus providing for the nut obtaining a good hold on the bolt before engaging the strip 5, it will be observed that it is not required to hold the strip while starting the nut, and, as the threads of the nut engage the strip at the inner end of the flat portion 3 the thrust of the nut is first directed longitudinally of the bolt so that the strip at this point is compressed into the outer thread of the unmutilated threads of the bolt and the strip is held in its alined position with the bolt during further movement of the nut. Thus by simply flattening the bolt on one side at the outer end, and shaping the strip so as to have the outer portion thereof lie flat on said flat face of the nut, I am enabled to apply my nut lock to the ordinary bolt without specially constructing the same, and without injuring the same so as to prevent its use without the lock.

By interposing the soft metal strip 5 upon one side of the bolt, the threads of the nut upon the opposite side of the bolt will be forced into firm engagement with the threads of the bolt, and it will be impossible for any jarring or vibrating of the bolt to dislodge the nut.

It is apparent that my nut lock is easily and quickly placed in position and can be used with bolts and nuts employed for various purposes.

Having now described my invention what I claim as new, is:—

In a nut lock, a bolt provided with a flat face and a nut screwing on said bolt, combined with a thin strip of soft metal of a width materially less than the width of the flat surface on said bolt and the edges of that portion of the strip which engages the flat face of the bolt lying wholly within the diameter confines of the bolt whereby the nut in screwing on the bolt makes its first engagement with the strip at the inner end of the flat face of said bolt.

In testimony whereof I affix my signature in the presence of two witnesses.

HARRY JEFFREY.

Witnesses:
　Louis F. Steuerle,
　Elizabeth Beall.